(12) United States Patent
Coghan, IV

(10) Patent No.: US 9,739,297 B1
(45) Date of Patent: Aug. 22, 2017

(54) CLIP APPARATUS TO REMOVABLY SECURE ITEM AGAINST EXTERNAL SURFACE TO WHICH APPARATUS IS SECURED

(71) Applicant: Francis F. Coghan, IV, Apple Valley, CA (US)

(72) Inventor: Francis F. Coghan, IV, Apple Valley, CA (US)

( * ) Notice: Subject to any disclaimer, the term of this patent is extended or adjusted under 35 U.S.C. 154(b) by 0 days.

(21) Appl. No.: 15/356,187

(22) Filed: Nov. 18, 2016

(51) Int. Cl.
*F16B 2/12* (2006.01)
*F16M 13/02* (2006.01)

(52) U.S. Cl.
CPC ............. *F16B 2/12* (2013.01); *F16M 13/02* (2013.01)

(58) Field of Classification Search
CPC .................................. F16B 2/12; F16M 13/02
USPC ....................................................... 248/217.4
See application file for complete search history.

(56) References Cited

U.S. PATENT DOCUMENTS

| 1,758,873 | A | * | 5/1930 | Wickes | A47G 29/093 248/229.15 |
| 3,769,774 | A | * | 11/1973 | Barnes | E04B 1/4157 248/58 |
| 4,904,105 | A | * | 2/1990 | Myers | E04C 2/428 403/24 |
| 5,009,386 | A | * | 4/1991 | Berger | F16L 3/2053 248/59 |

* cited by examiner

*Primary Examiner* — Anita M King
(74) *Attorney, Agent, or Firm* — Michael Dryja

(57) ABSTRACT

A clip member has a body having a hole extending therethrough, and a securing element extending from the body. A stop member is positioned against the body of the clip member and has a hole concentric with the hole extending through the body of the clip member. A fastening member extends through the hole of the body of the clip member and through the hole of the stop member, and has a securing portion to secure the fastening member to an external surface, and a sliding portion along which the clip member is movable. A biasing spring is coiled around the fastening member and positioned between the body of the clip member and the fastening member to bias the clip member along the fastening member against the stop member.

19 Claims, 6 Drawing Sheets

CLIP APPARATUS TO REMOVABLY SECURE ITEM AGAINST EXTERNAL SURFACE TO WHICH APPARATUS IS SECURED

BACKGROUND

A popular tradition to celebrate many holidays, such as Christmas, is the hanging of lights on one's home. Christmas lights, for instance, are typically strings of individual lights. The string is affixed at multiple points to the side of one's house, and an electrical plug located at one end of the string connected to an electrical outlet or a corresponding receptacle on a different string. The hanging of holiday lights has transitioned to other holidays as well, including Halloween, and is also common in holidays of many different cultural traditions, including Diwali and Chinese New Year.

SUMMARY

An example apparatus includes a clip member. The clip member has a body with a first end surface, a second end surface opposite the first end surface, and a hole extending through the body from the first end surface to the second end surface. The clip member has a securing element extending from the body towards the second end surface of the body and having an end. The apparatus includes a stop member positioned against the second end surface of the body of the clip member and having a hole concentric with the hole extending through the body of the clip member.

The apparatus includes a fastening member extending through the hole of the body of the clip member and through the hole of the stop member. The fastening member has a first end and a second end opposite the first end. The fastening member has a securing portion located from the second end to the stop member to secure the fastening member to an external surface. The fastening member has a sliding portion located from the first end of the fastening member towards the stop member. The clip member is movable along the sliding portion between the first end of the fastening member and the stop member. The apparatus includes a biasing spring coiled around the fastening member and positioned between the first end surface of the body of the clip member and the first end of the fastening member, to bias the clip member along the fastening member against the stop member.

Another example apparatus includes a clip member. The clip member has a body having a first end surface, a second end surface opposite the first end surface, and a hole extending through the body from the first end surface to the second end surface. The clip member has a securing element extending from the body towards the second end surface of the body and having an end. The clip member has a cap element extending about the body and above the securing element.

The apparatus includes a stud. The stud has a stud body having a hole concentric with the hole extending through the body of the clip member. The stud body extends through the hole extending through the body of the clip member. The stud has a stop member at an end of the stud body. The stop member is positioned against the second end surface of the body of the clip member and has a hole concentric with the hole extending through the body of the clip member and concentric with the hole of the stud body.

The apparatus includes a fastening member extending through the hole of the body of the clip member, through the hole of the stud body, and through the hole of the stop member. The fastening member has a first end and a second end opposite the first end. The fastening member has a securing portion located from the second end to the stop member to secure the fastening member to an external surface. The fastening member has a sliding portion located from the first end of the fastening member towards the stop member. The clip member is movable along the sliding portion between the first end of the fastening member and the stop member. The fastening member has a head at the first end.

The apparatus includes a biasing spring coiled around the fastening member and positioned between the first end surface of the body of the clip member and the first end of the fastening member. The clip member has a default position in which the biasing spring biases the clip member against the stop member. In the default position of the clip member, the end of the securing element is positioned adjacent to the external surface, and the securing element removably secures an item to the external surface. The clip member has a non-default position in which an external force causes the clip member to move along the sliding portion towards the first end of the fastening member in counteraction of biasing of the biasing spring. In the non-default position of the clip member, the end of the securing element is not positioned adjacent to the external surface, a gap defined between the end of the securing element and the external surface permitting removal of the item previously secured to the external surface and permitting disposal of the item between the clip member and the external surface.

Still another example apparatus includes a clip member having a body having a hole extending therethrough, and a securing element extending from the body. The apparatus includes a stop member positioned against the body of the clip member and having a hole concentric with the hole extending through the body of the clip member. The apparatus includes a fastening member extending through the hole of the body of the clip member and through the hole of the stop member, having a securing portion to secure the fastening member to an external surface, and having a sliding portion along which the clip member is movable. The apparatus includes a biasing spring coiled around the fastening member and positioned between the body of the clip member and the fastening member, to bias the clip member along the fastening member against the stop member.

An example method is with respect to an apparatus having a clip member, a stop member, a fastening member, and a biasing spring. The clip member has a body and a securing element. The body has a first end surface, a second end surface opposite the first end surface, and a hole extending through the body from the first end surface to the second end surface. The securing element extends from the body towards the second end surface of the body and has an end. The stop member is positioned against the second end surface of the body of the clip member and has a hole concentric with the hole extending through the body of the clip member.

The fastening member extends through the hole of the body of the clip member and through the hole of the stop member. The fastening member has a first end, a second end opposite the first end, a securing portion, and a sliding portion. The securing portion is located from the second end to the stop member to secure the fastening member to an external surface. The sliding portion is located from the first end of the fastening member to the stop member. The clip member is movable along the sliding portion between the first end of the fastening member and the stop member. The biasing spring is coiled around the fastening member and positioned between the first end surface of the body of the clip member and the first end of the fastening member, to bias the clip member along the fastening member against the stop member.

The method includes lifting the clip member to counteract biasing of the biasing spring pushing the clip member towards the external surface and to define a gap between the securing element and the external surface. The method includes inserting the item through the gap and between the clip member and the external surface. The method includes releasing the clip member. The biasing spring of the apparatus correspondingly pushes the clip member towards the external surface to eliminate the gap between the securing element and the external surface. The securing element is positioned against the external surface to removably secure the item to the external surface.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a popular tradition to celebrate various includes hanging holiday lights on one's home. Existing techniques for affixing a string of lights at multiple points of a house are problematic. Using screws or nails can be undesirable, because the light strings may have to be wrapped around the screws or nails, lest the strings become dislodged in strong winds and fall to the ground. Using screw-in or nail-in clips to ensure that the light strings stay hung can also be undesirable, because such clips then have to be removed to remove the light strings, and have to be attached to different points to the surface of a house from year-to-year to ensure that they themselves do not fall out.

That is, reusing the screw or nail holes can result in an insufficiently strong attachment of the light strings to the house surface over the years. Using non-penetrating clips that clip onto shingles or gutters can also be undesirable, because they are more likely to become dislodged than invasive mechanisms like screws, nails, and screw-in and nail-in clips.

Disclosed herein, by comparison, is a clip apparatus that overcomes these and other issues. The clip apparatus is penetratingly attached to a surface, like the side of a house, via a fastening member of the apparatus, like a screw. Once the apparatus is attached to the surface, a clip member thereof can be moved open, along a portion of the fastening member, to permit insertion of a light string (or other item), and then released to secure the light string to the side of the house (or other surface). A biasing spring of the apparatus is coiled around the fastening member and biases the clip member against a stop member of the apparatus. Unlike existing screw-in or nail-clips, the clip apparatus disclosed herein does not have to be removed from the surface to remove the light string itself. The clip apparatus can stay attached to the side of a house from year to year, permitting easy hanging and subsequent removal of a light strong each holiday season.

Figure 1:
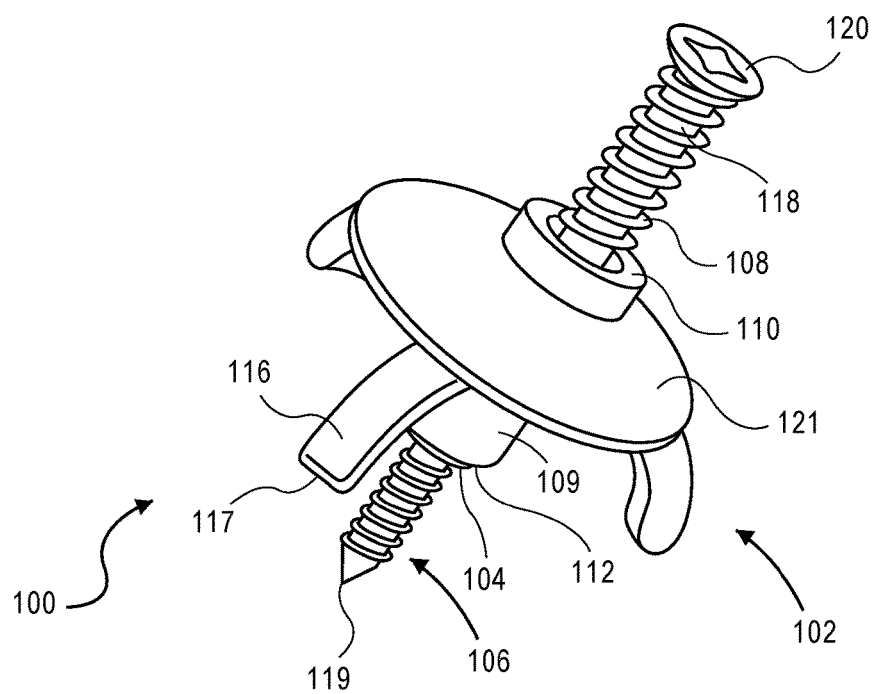
FIGS. 1, 2, and 3 are diagrams of an integral perspective view, a cross-sectional side view, and an exploded side view, respectively, of an example clip apparatus.
Figure 2:
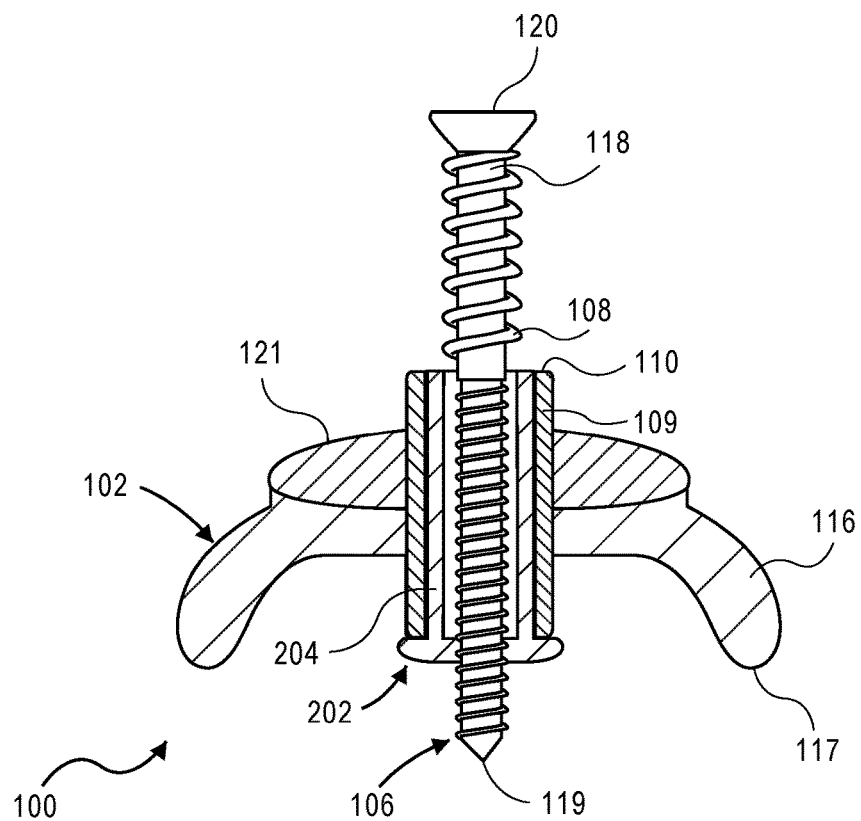
Figure 3:
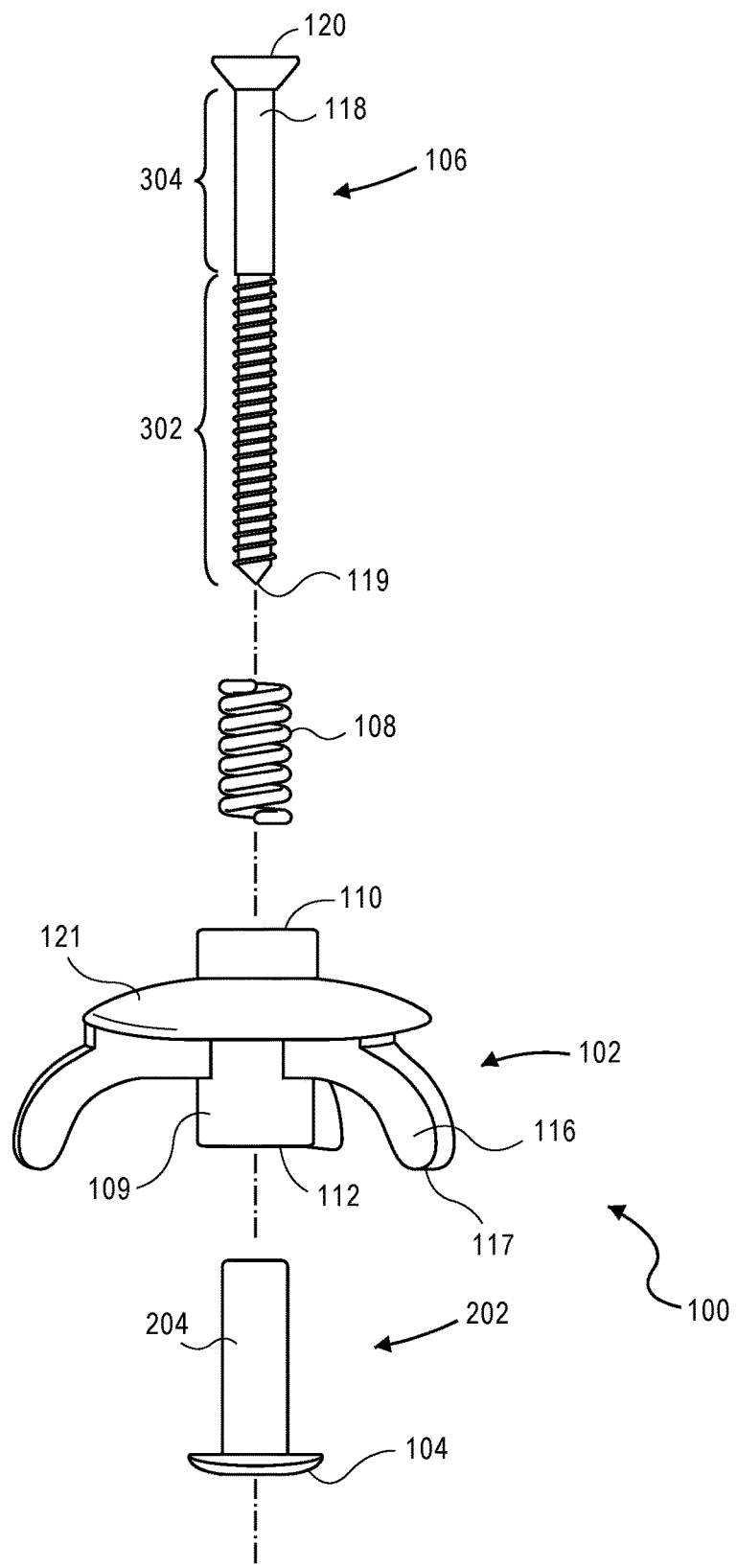

FIGS. 1, 2, and 3 show an integral perspective view, a cross-sectional side view, and an exploded side view, respectively, of an example clip apparatus 100. Reference numbers common to different figures refer to the same component across the figures. Furthermore, the initial digit of each reference number indicates the figure in which the reference number is first referenced. For example, reference numbers of the form 1xx indicate that they are first introduced in FIG. 1; reference numbers of the form 2xx indicate that they are first introduced in FIG. 2 (and not FIG. 1); and so on.

The clip apparatus 100 includes a clip member 102, a stop member 104, a fastening member 106, and a biasing spring 108. The clip member 102 may be fashioned from plastic or another suitably rigid material. The clip member 102 includes a body 109 and a securing element 116, and can include a cap element 121. The body 109 has a first end surface 110 and a second end surface 112 opposite the first end surface 110. The body 109 defines a hole extending therethrough, from the first end surface 110 and the second end surface 112. The securing element 116 identified in the figures can be one of multiple such securing elements; three are depicted in various figures. The securing element 116 can be a prong, and has an end 117. The cap element 121 extends about the body 109 above the securing element 116 and is user handleable to promote user movement of the clip member 102 from a default position to a non-default position, the two positions being described later in the detailed description.

The stop member 104 can be part of a stud 202 that also has a stud body 204 ending at the stop member 104. The stud 202 may be fashioned from metal, like steel, or another suitably rigid material. The stop member 104 is positioned against the second end surface 112 of the body 109 of the clip member 102. The stop member 104 and the stud body 204 define corresponding holes concentric with one another and with the hole extending through the body 109 of the clip member 102. The stud body 204 extends through the hole of the body 109 of the clip member 109.

The fastening member 106 can be a screw or another type of fastening member, such as a nail or a bolt. The fastening member 106 extends through the hole of the body 109 of the clip member 102, and more particularly through the hole of the stud body 204 of the stud 202. The fastening member 106 also extends through the hole of the stop member 104. The fastening member 106 has a first end 118 and a second end 119 opposite the first end 118. The fastening member 106 has a securing portion 302 and a sliding portion 304. The fastening member 106 can have a head 120 at the first end 118 thereof.

The securing portion 302 is located from the second end 119 of the fastening member 106 to the stop member 104 (including at least to the stop member 104, and past the stop member 104), and penetratingly secures the fastening member 106 to an external surface. The sliding portion 304 is located from the first end 118 of the fastening member 106 towards the stop member 104. The clip member 102 is movable along the sliding portion 304 between the first end 118 of the fastening member 106 and the stop member 104. The demarcation between the securing portion 302 and the sliding portion 304 can be between the stop member 104 and a top of the stud body 204.

In an implementation in which the fastening member 106 is a screw, the head 120 can have a screw pattern, such as a flathead screwdriver screw pattern or a Phillips screwdriver screen pattern. In such an implementation, the securing portion 302 can have screw threads to promote screwing of the fastening member 106 into an external service to penetratingly secure the fastening member 106 to the external surface. The sliding portion 304 may have a surface that at least a portion of which is smooth, without any screw threads.

The fastening member 106 can be permanently affixed within the stud 202, such as within the stud body 204 and the stop member 104 of the stud 202. For example, once the fastening member 106 has been inserted through the stud 202 starting at the stud body 204 side of the stud 202 such that the securing portion 302 is completely, substantially, or sufficiently exposed at the stop member 104 side of the stud 202, adhesive may be applied to permanently affix the fastening member 106 at this configuration relative to the stud 202. As another example, adhesive may be applied before (and also after, or instead of after) inserting the fastening member 106 through the stud 202, and once the fastening member 106 as at the desired configuration relative to the stud 202, any excess adhesive removed before the adhesive dries or otherwise cures. As a third example, in the implementation in which the fastening member 106 is a screw, the screwing force necessary to screw the fastening member 106 through the stud 202 may be greater than that necessary to screw the securing portion 302 penetratingly into an external surface, such that adhesive may not be needed (but can still be applied).

The biasing spring 108 is coiled around the fastening member 106, and is positioned between first end surface 110 of the body 109 of the clip member 102 and the first end 118 of the fastening member 106. The biasing spring 108 may be fabricated from metal, like steel, or another elastic material. The spring 108 may be a helical spring. The biasing spring 108 biases the clip member 102 along the fastening member 106 against the stop member 104.

Therefore, the clip member 102 has a default position and a non-default position. In the default position, as depicted in FIGS. 1 and 2 specifically, the biasing spring 108 biases the clip member 102 against the stop member 104. In the non-default position, an external force, such as the fingers of a user or a tool or device, causes the clip member 102 to move along the sliding portion 304 of the fastening member 106 towards the first end of the fastening member 106 in counteraction of biasing of the biasing spring 108. However, subsequent release of the applied external force causes the clip member 102 to return to its default position, because there is no more counteracting (and greater) force than the biasing force of the biasing spring 108 which pushes the clip member 102 against the sop member 104.

Figure 4:
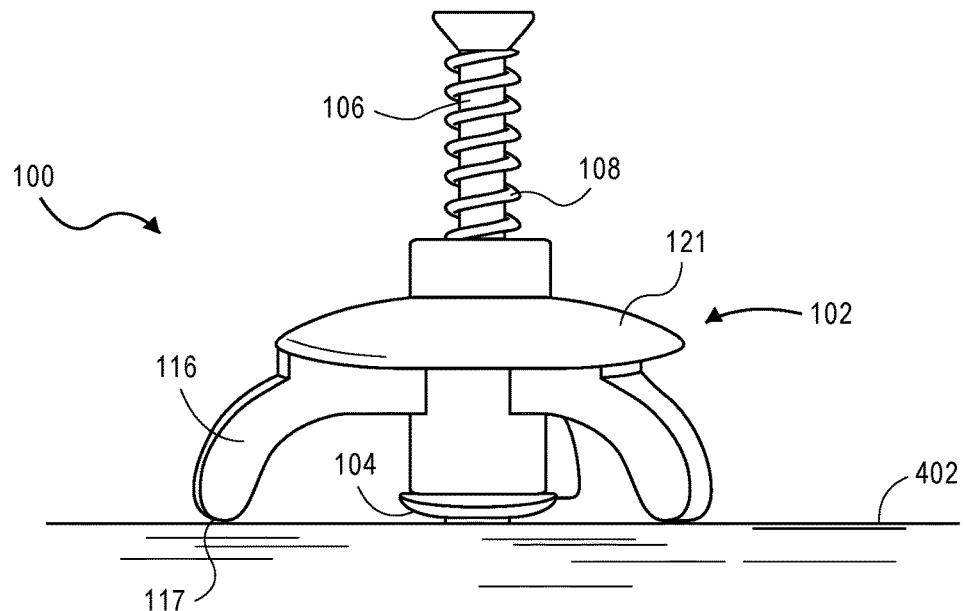
FIGS. 4 and 5 are diagrams of the example clip apparatus of FIGS. 1, 2, and 3 in a default position and in a non-default position, respectively.
Figure 5:
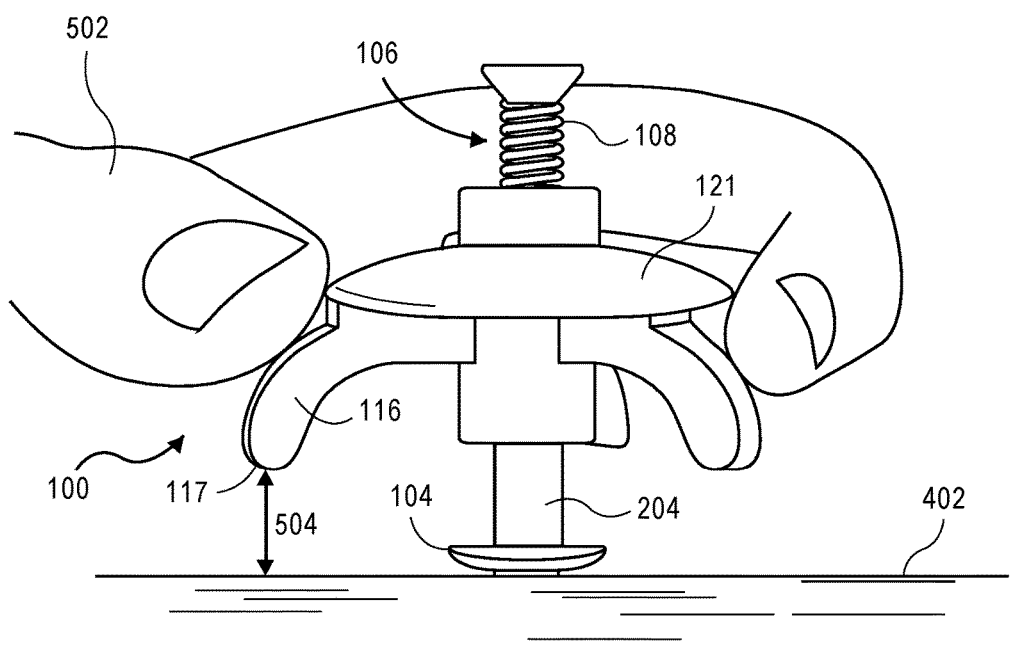

FIGS. 4 and 5 respectively depict the default and non-default positions of the clip member 102 of the clip apparatus 100. In both FIGS. 4 and 5, the fastening member 106 has been penetratingly secured into an external surface 402, which may be the side of a house, for instance, and thus may be wood, brick, or another material. That is, comparison of FIGS. 1, 2, and 3 with FIGS. 4 and 5 demonstrates that the securing portion 302 of the fastening member 106 has penetrated into the surface 402. When securing the fastening member 106 into the surface 402, the stop member 104 acts as a barrier past which the clip apparatus 100 as a whole cannot penetrate the surface 402. As such, the stop member 104 is a member that acts as a stop both with respect to the clip member 102 sliding along the fastening member 106 (i.e., so the clip member 102 will not slide off the fastening member 106), as described above, as well as with respect to the clip apparatus 100 as a whole vis-à-vis the external surface 402.

In the default position of the clip member 102 of FIG. 4, the end 117 of each securing element 116 of the clip member 102 is positioned adjacent, against, and next to the external surface 402. In this respect, prior to securing the clip apparatus 100 into the external surface 402, the end 117 extends even with (i.e., aligned with or flush to) the stop member 104, or just past the stop member 104. This is so that upon securing the clip apparatus 100 into the external surface 402, the end 117 is in contact with the external surface 402 in the default position of the clip member 102. As such, an item like a string of lights can be removably secured to the external surface 402 via this contact of the end 117 of each securing element 116 of the clip member 102 and the surface 402. The biasing spring 108 biases the clip member 102 against the external surface 402 in this default position in which no counteracting force is present against the biasing force of the spring 108.

In the non-default position of the clip member 102 of FIG. 5, an external force, such as via one or more fingers 502 lifting up the clip member 102 at the cap element 121 thereof away from the external surface 402, causes the clip member 102 to move along the fastening member 106 in counteraction of biasing force of the biasing spring 108. It is noted that the stud body 204 may thus be exposed. In the non-default position, the end 117 of each securing element 116 of the clip member 102 is no longer in contact with the external surface 402. Rather, lifting up of the clip member 102 (i.e., sliding or moving the fastening member 106 along the fastening member 106) defines a gap 504 between the end 117 of each securing element 116 of the clip member 102 and the external surface 402. Therefore, any item, like a string of lights, previously secured to the external surface 402 in the default position of FIG. 4 can now be removed, through the gap 504, in the non-default position of FIG. 5.

Likewise, an item, again like a string of lights, can be inserted through the gap 504 and disposed between the clip member 102 and the external surface 402 in the non-default position of FIG. 5. Subsequent removal of the counteracting external force (i.e., removal of the fingers 502 in the example of FIG. 5) results in the clip member 102 transition back from the non-default position of FIG. 5 to the default position of FIG. 4. Therefore, if an item like a string of lights was inserted while the clip member 102 was in the non-default position of FIG. 5, the string of lights then becomes secured to the external surface 402 in the default position of FIG. 4, when the end 117 of each securing element 116 again makes contact with the surface 402.

Figure 6:
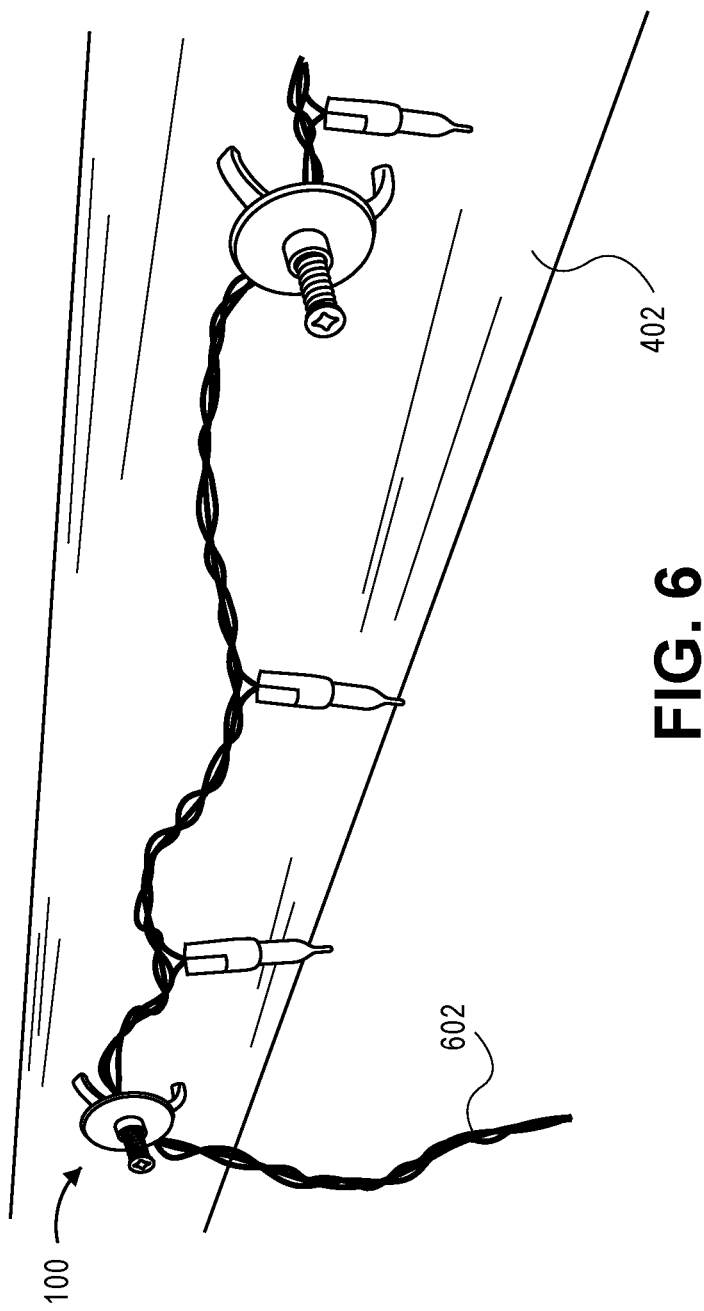
FIG. 6 is a diagram of example multiple clip apparatuses of FIGS. 1, 2, and 3 securing an item to an external surface while in the default position of FIG. 4.

FIG. 6 shows an example of multiple clip apparatuses 100 securing an item, particularly a string of lights 602, to the external surface 402. In FIG. 6, each clip apparatus 100 is in the default position of FIG. 4. Therefore, the prongs or other securing elements of the clip apparatuses 100 are in contact with the external surface 402. This deters or prohibits the light string 602 from sliding out of the clip apparatuses 100 and off the external surface 402. However, removal of the light string 602 is easily accomplished by momentarily or temporarily causing each clip apparatus 100, on an apparatus-by-apparatus basis, from the default position of FIG. 4 to the non-default position of FIG. 5. While a clip apparatus 100 is temporarily in the non-default position of FIG. 5, the light string 602 can simply be removed from under the clip member of the clip apparatus 100, through the gap between the ends of the prongs or other securing elements of the clip apparatus 100 and the external surface 100 that results in the non-default position, as described above.

Figure 7:
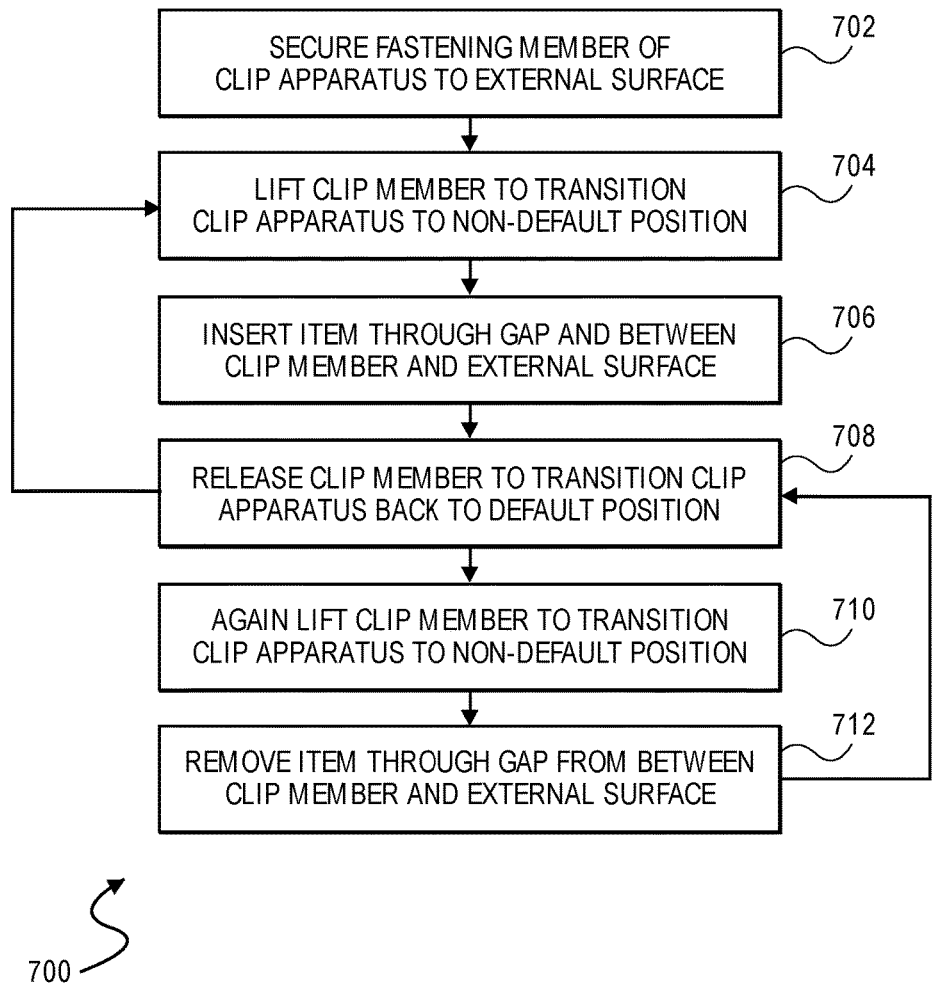
FIG. 7 is a flowchart of an example method that is performed in relation to the example clip apparatus of FIGS. 1, 2, and 3 to secure the clip apparatus to an external surface, such as that of FIG. 6, and to subsequently transition the clip apparatus between the default and non-default positions of FIGS. 4 and 5.

FIG. 7 shows an example method of use of the clip apparatus 100. The fastening member of the clip apparatus is secured to an external surface (702). For instance, if the fastening member is a screw, the fastening member is screwed into the external surface until the stop member is in contact with the external surface. Part 702 can be performed just once. That is, once the clip apparatus has itself been penetratingly secured to the external surface, the apparatus can remain on the surface indefinitely. In the case of holiday lights, for instance, the apparatus can remain on the side of a house as the holiday comes and goes over the years, regardless of whether the clip apparatus is currently being used during the holiday to temporarily secure light strings to the house.

To use the clip apparatus to temporarily secure an item to the external apparatus, the clip member is lifted to transition the clip apparatus from the default position of FIG. 4 to the non-default position of FIG. 5 (704). Specifically, the clip member of the clip apparatus is lifted to counteract the biasing of the biasing spring that pushes the clip member towards the external surface and that maintains the clip apparatus in the default position. Lifting the clip member away from the external surface in this manner defines or creates a gap between the prongs or other securing elements of the clip member of the clip apparatus and the external surface, as has been described above.

An item, like a light string, can then be inserted through the resulting gap and positioned between the clip member and the external surface (706), after which the clip member is released to transition the clip apparatus back to the default position (708). Once in the default position, the item is thus secured temporarily to the external surface. By releasing of the clip, the biasing spring of the clip apparatus no longer has a counteracting force against its bias force, and thus pushes the clip member back towards the external surface, eliminating or removing the gap between the clip member and the external surface. The securing element of the clip member of the clip apparatus is thus positioned against the external surface and the clip member removably secures the item to the external surface. From part 708, if another item is to later be secured to the external surface along with the item that has just been secured, the method 700 can return to part 704.

Once the (or any) item that has been temporarily secured to the external surface via the clip apparatus is desired to be subsequently removed, the clip member of the clip apparatus is again lifted to transition the apparatus to the non-default position (710). This results in again defining the gap between the securing element of the clip member and the external apparatus. As such, the item temporarily secured to the external surface can be removed from under the clip member and through the resulting gap (712). The method 700 proceeds back to part 708, at which release of the clip member results in the biasing spring again pushing the clip member towards the external surface to again eliminate the gap between the securing element of the clip member of the clip apparatus.

The clip apparatus that has been described therefore provides a convenient way by which light strings and other items can be temporarily secured to external surfaces like those of houses. The clip apparatus can be penetratingly installed or secured to an external surface just once, and thereafter remain secured or situated in place on the surface. Transitioning the clip apparatus from the default position to the non-default position creates a gap between the securing portion of the clip member of the apparatus through which an item like a light string can be inserted, and subsequent transition of the apparatus back to the default position temporarily secures the item to the external surface. The clip apparatus can be transitioned again to the non-default position for easy removal of the item from its temporary securement to the surface. The clip apparatus that has been described can permit temporary securement, or attachment, of an item to a surface without the use of any tools particularly once the apparatus itself has been penetratingly secured to the surface, which also promotes convenience.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For example, while a particular embodiment of a clip apparatus has been shown, deviations and modifications thereof are contemplated pursuant to the claims appended below. As another example, while a clip apparatus has been described in relation to temporarily securing light strings to a house surface, the apparatus may generally can be used to temporarily secure other types of items to other types of external surfaces. It is thus manifestly intended that this invention be limited only by the claims and equivalents thereof.

I claim:

1. An apparatus comprising:
   a clip member having:
      a body with a first end surface, a second end surface opposite the first end surface, and a hole extending through the body from the first end surface to the second end surface;
      a securing element extending from the body towards the second end surface of the body and having an end;
   a stop member positioned against the second end surface of the body of the clip member and having a hole concentric with the hole extending through the body of the clip member;
   a fastening member extending through the hole of the body of the clip member and through the hole of the stop member, and having:
      a first end and a second end opposite the first end;
      a securing portion located from the second end to the stop member to secure the fastening member to an external surface;

a sliding portion located from the first end of the fastening member towards the stop member, the clip member movable along the sliding portion between the first end of the fastening member and the stop member; and a biasing spring coiled around the fastening member and positioned between the first end surface of the body of the clip member and the first end of the fastening member, to bias the clip member along the fastening member against the stop member.

2. The apparatus of claim 1, wherein the clip member has a default position in which the biasing spring biases the clip member against the stop member, and wherein in the default position of the clip member, the end of the securing element is positioned adjacent to the external surface, and the securing element removably secures an item to the external surface.

3. The apparatus of claim 2, wherein the clip member has a non-default position in which an external force causes the clip member to move along the sliding portion towards the first end of the fastening member in counteraction of biasing of the biasing spring, and wherein in the non-default position of the clip member, the end of the securing element is not positioned adjacent to the external surface, a gap defined between the end of the securing element and the external surface permitting removal of the item previously secured to the external surface and permitting disposal of the item between the clip member and the external surface.

4. The apparatus of claim 3, wherein the clip member further has:

a cap element extending about the body and above the securing element and user handleable to move the clip member from the default position to the non-default position.

5. The apparatus of claim 1, wherein the clip member further has a plurality of securing elements including the securing element.

6. The apparatus of claim 1, wherein the securing element is a prong.

7. The apparatus of claim 1, further comprising:

a stud including the stop member, the stud also having a stud body ending at the stop member, wherein the fastening member extends through a hole of the stud body concentric with the hole of the stop member and the hole extending through the body of the clip member, and wherein the stud body extends through the hole extending through the body of the clip member.

8. The apparatus of claim 1, wherein the fastening member further has:

a head at the first end of the fastening member.

9. The apparatus of claim 8, wherein the fastening member is a screw, the head of the fastening member having a screw pattern, the securing portion having screw threads, the sliding portion having a surface that at least a portion of which is smooth without any screw threads.

10. An apparatus comprising:

a clip member having:

a body having a first end surface, a second end surface opposite the first end surface, and a hole extending through the body from the first end surface to the second end surface;

a securing element extending from the body towards the second end surface of the body and having an end;

a cap element extending about the body and above the securing element;

a stud having:

a stud body having a hole concentric with the hole extending through the body of the clip member, the stud body extending through the hole extending through the body of the clip member;

a stop member at an end of the stud body, the stop member positioned against the second end surface of the body of the clip member and having a hole concentric with the hole extending through the body of the clip member and concentric with the hole of the stud body;

a fastening member extending through the hole of the body of the clip member, through the hole of the stud body, and through the hole of the stop member, the fastening member having:

a first end and a second end opposite the first end;

a securing portion located from the second end to the stop member to secure the fastening member to an external surface;

a sliding portion located from the first end of the fastening member towards the stop member, the clip member movable along the sliding portion between the first end of the fastening member and the stop member;

a head at the first end; and a biasing spring coiled around the fastening member and positioned between the first end surface of the body of the clip member and the first end of the fastening member, wherein the clip member has a default position in which the biasing spring biases the clip member against the stop member, wherein in the default position of the clip member, the end of the securing element is positioned adjacent to the external surface, and the securing element removably secures an item to the external surface, wherein the clip member has a non-default position in which an external force causes the clip member to move along the sliding portion towards the first end of the fastening member in counteraction of biasing of the biasing spring, and wherein in the non-default position of the clip member, the end of the securing element is not positioned adjacent to the external surface, a gap defined between the end of the securing element and the external surface permitting removal of the item previously secured to the external surface and permitting disposal of the item between the clip member and the external surface.

11. The apparatus of claim 10, wherein the clip member further has a plurality of securing elements including the securing element.

12. The apparatus of claim 11, wherein each securing element is a prong.

13. The apparatus of claim 10, wherein the fastening member is a screw, the head of the fastening member having a screw pattern, the securing portion having screw threads, the sliding portion having a surface that at least a portion of which is smooth without any screw threads.

14. An apparatus comprising:

a clip member having a body having a hole extending therethrough, and a securing element extending from the body;

a stop member positioned against the body of the clip member and having a hole concentric with the hole extending through the body of the clip member;

a fastening member extending through the hole of the body of the clip member and through the hole of the stop member, having a securing portion to secure the fastening member to an external surface, and having a sliding portion along which the clip member is movable; and a biasing spring coiled around the fastening member and positioned between the body of the clip member and the fastening member, to bias the clip member along the fastening member against the stop member.

15. The apparatus of claim 14, wherein the clip member has a default position in which the biasing spring biases the clip member against the stop member, and wherein in the default position of the clip member, the securing element is positioned adjacent to the external surface, and the securing element removably secures an item to the external surface.

16. The apparatus of claim 15, wherein the clip member has a non-default position in which an external force causes the clip member to move along the sliding portion towards the fastening member in counteraction of biasing of the biasing spring, and wherein in the non-default position of the clip member, the end of the securing element is not positioned adjacent to the external surface, a gap defined between the end of the securing element and the external surface permitting removal of the item previously secured to the external surface and permitting disposal of the item between the clip member and the external surface.

17. A method comprising:

with respect to an apparatus having a clip member, a stop member, a fastening member, and a biasing spring, the clip member having a body and a securing element, the body having a first end surface, a second end surface opposite the first end surface, and a hole extending through the body from the first end surface to the second end surface, the securing element extending from the body towards the second end surface of the body and having an end, the stop member positioned against the second end surface of the body of the clip member and having a hole concentric with the hole extending through the body of the clip member, the fastening member extending through the hole of the body of the clip member and through the hole of the stop member, the fastening member having a first end, a second end opposite the first end, a securing portion, and a sliding portion, the securing portion located from the second end towards the stop member to secure the fastening member to an external surface, the sliding portion located from the first end of the fastening member to the stop member, the clip member movable along the sliding portion between the first end of the fastening member and the stop member, the biasing spring coiled around the fastening member and positioned between the first end surface of the body of the clip member and the first end of the fastening member, to bias the clip member along the fastening member against the stop member:

lifting the clip member to counteract biasing of the biasing spring pushing the clip member towards the external surface and to define a gap between the securing element and the external surface;

inserting the item through the gap and between the clip member and the external surface; and releasing the clip member, the biasing spring of the apparatus correspondingly pushing the clip member towards the external surface to eliminate the gap between the securing element and the external surface, the securing element positioned against the external surface to removably secure the item to the external surface.

18. The method of claim 17, further comprising:

again lifting the clip member to counteract biasing of the biasing spring pushing the clip member towards the external surface and to again define the gap between the securing element and the external surface;

removing the item through the gap; and releasing the clip member, the biasing spring of the apparatus correspondingly pushing the clip member towards the external surface to eliminate the gap between the securing element and the external surface.

19. The method of claim 17, further comprising:

securing the fastening member to the external surface by causing the securing portion to completely penetrate the external surface.

* * * * *